(12) United States Patent
Rozas et al.

(10) Patent No.: US 8,413,162 B1
(45) Date of Patent: Apr. 2, 2013

(54) MULTI-THREADING BASED ON ROLLBACK

(76) Inventors: Guillermo J. Rozas, Los Gatos, CA (US); Michael R. Neilly, Cupertino, CA (US)

( * ) Notice: Subject to any disclaimer, the term of this patent is extended or adjusted under 35 U.S.C. 154(b) by 1463 days.

(21) Appl. No.: 11/169,404

(22) Filed: Jun. 28, 2005

(51) Int. Cl.
*G06F 9/46* (2006.01)

(52) U.S. Cl. .................... 718/108; 718/100; 718/101

(58) Field of Classification Search ............ 718/1, 100, 718/101, 105, 107, 108; 714/19; 712/227, 712/228
See application file for complete search history.

(56) References Cited

U.S. PATENT DOCUMENTS

| | | |
|---|---|---|
| 4,435,459 A | 3/1984 | McKinney et al. |
| 4,794,522 A | 12/1988 | Simpson |
| 4,794,552 A | 12/1988 | Burn |
| 5,167,023 A | 11/1992 | de Nicolas et al. |
| 5,361,389 A | 11/1994 | Fitch |
| 5,363,366 A | 11/1994 | Wisdom, Jr. et al. |
| 5,494,821 A | 2/1996 | Takahashi et al. |
| 5,537,559 A | 7/1996 | Kane et al. |
| 5,568,380 A * | 10/1996 | Brodnax et al. ............. 700/79 |
| 5,596,390 A | 1/1997 | Sawada |
| 5,625,835 A | 4/1997 | Ebcioglu et al. |
| 5,636,366 A | 6/1997 | Robinson et al. |
| 5,649,136 A | 7/1997 | Shen et al. |
| 5,668,969 A | 9/1997 | Fitch |
| 5,692,169 A | 11/1997 | Kathail et al. |
| 5,721,927 A | 2/1998 | Baraz et al. |
| 5,724,590 A | 3/1998 | Goettelmann et al. |
| 5,748,936 A | 5/1998 | Karp et al. |
| 5,751,942 A | 5/1998 | Christensen et al. |
| 5,751,982 A | 5/1998 | Morley |
| 5,757,942 A | 5/1998 | Kamatani et al. |
| 5,761,467 A | 6/1998 | Ando |
| 5,784,585 A | 7/1998 | Denman |
| 5,790,625 A | 8/1998 | Arimilli |
| 5,790,825 A | 8/1998 | Traut |
| 5,832,202 A | 11/1998 | Slavenburg et al. |
| 5,832,205 A | 11/1998 | Kelly et al. |
| 5,842,017 A | 11/1998 | Hookway et al. |
| 5,867,681 A | 2/1999 | Worrell et al. |
| 5,875,318 A | 2/1999 | Langford |
| 5,915,117 A | 6/1999 | Ross et al. |
| 5,925,123 A | 7/1999 | Tremblay et al. |
| 5,948,112 A * | 9/1999 | Shimada et al. ............. 714/16 |
| 6,011,908 A * | 1/2000 | Wing et al. ................. 714/19 |
| 6,031,992 A | 2/2000 | Cmelik et al. |

(Continued)

FOREIGN PATENT DOCUMENTS

| | | |
|---|---|---|
| EP | 0908820 | 4/1999 |
| WO | 0148605 | 7/2001 |

OTHER PUBLICATIONS

Hwu et al. "Checkpoint repair for out-of-order execution machines", Proceedings of the 14th annual international symposium on Computer architecture, 1987, pp. 18-26.*

(Continued)

*Primary Examiner* — Emerson Puente
*Assistant Examiner* — Willy W Huaracha

(57) ABSTRACT

Methods of multi-threading, and systems thereof, are described. A first thread is executed. Context for the executing thread is maintained in a working register. Execution of the first thread is halted and execution of a second thread is begun by performing a rollback operation. The rollback operation causes context for the second thread to be copied from a first register into the working register.

20 Claims, 3 Drawing Sheets

U.S. PATENT DOCUMENTS

| | | | |
|---|---|---|---|
| 6,032,244 A * | 2/2000 | Moudgill | 712/23 |
| 6,044,450 A | 3/2000 | Tsushima et al. | |
| 6,052,708 A | 4/2000 | Flynn et al. | |
| 6,091,897 A | 7/2000 | Yates et al. | |
| 6,164,841 A | 12/2000 | Mattson, Jr. et al. | |
| 6,199,152 B1 | 3/2001 | Kelly et al. | |
| 6,295,600 B1 * | 9/2001 | Parady | 712/228 |
| 6,308,318 B2 | 10/2001 | Krishnaswamy | |
| 6,351,844 B1 | 2/2002 | Bala | |
| 6,356,615 B1 | 3/2002 | Coon et al. | |
| 6,363,336 B1 | 3/2002 | Banning et al. | |
| 6,408,325 B1 * | 6/2002 | Shaylor | 718/108 |
| 6,415,379 B1 | 7/2002 | Keppel et al. | |
| 6,438,677 B1 * | 8/2002 | Chaudhry et al. | 712/27 |
| 6,463,582 B1 | 10/2002 | Lethin et al. | |
| 6,594,821 B1 | 7/2003 | Banning et al. | |
| 6,615,300 B1 | 9/2003 | Banning et al. | |
| 6,704,925 B1 | 3/2004 | Bugnion | |
| 6,714,904 B1 | 3/2004 | Torvalds et al. | |
| 6,738,892 B1 | 5/2004 | Coon et al. | |
| 6,845,353 B1 | 1/2005 | Bedichek et al. | |
| 6,990,658 B1 | 1/2006 | Torvalds et al. | |
| 7,089,404 B1 | 8/2006 | Rozas et al. | |
| 7,096,460 B1 | 8/2006 | Banning et al. | |
| 7,107,580 B2 | 9/2006 | Zemach et al. | |
| 7,111,096 B1 | 9/2006 | Banning et al. | |
| 7,310,723 B1 | 12/2007 | Rozas et al. | |
| 7,331,041 B1 | 2/2008 | Torvalds et al. | |
| 7,404,181 B1 | 7/2008 | Banning et al. | |
| 7,475,230 B2 * | 1/2009 | Chou et al. | 712/228 |
| 7,761,857 B1 | 7/2010 | Bedichek et al. | |
| 7,904,891 B2 | 3/2011 | Banning et al. | |
| 8,019,983 B1 | 9/2011 | Rozas et al. | |
| 8,176,489 B2 * | 5/2012 | Bauer et al. | 718/100 |
| 2001/0047468 A1 * | 11/2001 | Parady | 712/228 |
| 2002/0092002 A1 | 7/2002 | Babaian et al. | |
| 2004/0015967 A1 * | 1/2004 | Morris | 718/100 |
| 2005/0060705 A1 * | 3/2005 | Katti et al. | 718/100 |
| 2006/0020776 A1 * | 1/2006 | Yoshida | 712/235 |
| 2006/0150194 A1 * | 7/2006 | Xing et al. | 718/108 |
| 2007/0006189 A1 | 1/2007 | Li et al. | |
| 2009/0125913 A1 * | 5/2009 | Bradford et al. | 718/108 |
| 2010/0262955 A1 | 10/2010 | Bedichek et al. | |
| 2012/0036502 A1 | 2/2012 | Banning et al. | |
| 2012/0079257 A1 | 3/2012 | Rozas et al. | |

OTHER PUBLICATIONS

Ung et al.; "Dynamic Re-Engineering of Binary Code With Run-Time Feedbacks;" Department of Computer Science and Electrical Engineering, University of Queensland, QLD, Australia; 2000.

Ung et al.; "Machine-Adaptable Dynamic Binary Translation;" Proceedings of the ACM Sigplan Workshop on Dynamic and Adapative Compilation and Optimization, Jan. 2000 pp. 30-40.

Holzle, Urs, Adaptive Optimization for SELF: Reconciling High Performance with Exploratory Programming, Dotorial Dissertation, Aug. 1994.

Cifuentes, Cristina and Malhotra, Vishv, Binary Translation: Static, Dynamic, Retargetable?, International Conference on Software Mainteance, Nov. 4-8, 1996.

Bala et al.; "Transparent Dynamic Optimization: The Design and Implementation of Dynamo;" HP Laboratories Cambridge HPL-1999-78; Jun. 1999.

Ex Parte Quayle Dated Jul. 2, 2008; U.S. Appl. No. 09/417,332.
Final OA Dated Jan. 18, 2007; U.S. Appl. No. 09/417,332.
Final OA Dated Feb. 13, 2004; U.S. Appl. No. 09/417,332.
Non Final OA Dated May 10, 2004; U.S. Appl. No. 09/417,332.
Non Final OA Dated Jan. 30, 2008; U.S. Appl. No. 09/417,332.
Non Final OA Dated May 13, 2003; U.S. Appl. No. 09/417,332.
Non Final OA Dated Jul. 26, 2007; U.S. Appl. No. 09/417,332.
Notice of Allowance Dated Jan. 12, 2009; U.S. Appl. No. 09/417,332.
Notice of Allowance Dated Sep. 8, 2008; U.S. Appl. No. 09/417,332.
Non Final OA Dated Mar. 29, 2006; U.S. Appl. No. 10/406,022.
Notice of Allowance Dated Jul. 27, 2007; U.S. Appl. No. 10/406,022.
Notice of Allowance Dated Feb. 21, 2003; U.S. Appl. No. 09/539,987.
Interview Summary Dated Apr. 14, 2003; U.S. Appl. No. 09/417,358.
Non Final OA Dated Apr. 25, 2002; U.S. Appl. No. 09/417,358.
Non Final OA Dated Dec. 20, 2000; U.S. Appl. No. 09/417,358.
Notice of Allowance Dated Jun. 20, 2003; U.S. Appl. No. 09/417,358.
OA Dated Sep. 6, 2001; U.S. Appl. No. 09/417,358.
Final Office Action Dated Jan. 16, 2009; U.S. Appl. No. 12/002,983.
Non Final Office Action Dated Aug. 5, 2008; U.S. Appl. No. 12/002,983.
Non Final Office Action; Mail Date May 26, 2009; U.S. Appl. No. 09/417,332.
Notice of Allowance; Mail Date Nov. 17, 2009; U.S. Appl. No. 09/417,332.
Non Final Office Action; Mail Date May 19, 2009; U.S. Appl. No. 12/002,983.
Non Final Office Action; Mail Date Dec. 2, 2009; U.S. Appl. No. 12/002,983.
Advisory Action; Mail Date Dec. 31, 2009; U.S. Appl. No. 12/177,836.
Final Office Action; Mail Date Oct. 22, 2009; U.S. Appl. No. 12/177,836.
Notice of Allowance Dated May 9, 2011, U.S. Appl. No. 12/002,983.
Final Office Action, Mailed Apr. 27, 2011; U.S. Appl. No. 12/578,500.
Notice of Allowance, Mailed May 11, 2011; U.S. Appl. No. 12/002,983.
Final Office Action Dated Aug. 3, 2012; U.S. Appl. No. 12/578,500.
Non-Final Office Action Dated Jul. 9, 2012; U.S. Appl. No. 13/221,812.

* cited by examiner

MULTI-THREADING BASED ON ROLLBACK

BACKGROUND OF THE INVENTION

1. Field of the Invention

Embodiments of the present invention relate to computer systems.

2. Related Art

Contemporary computer systems have the capacity to execute more instructions than they actually execute in practice. Improvements in performance are limited by, for example, the latencies associated with accessing memory or input/output devices. Some of the excess capacity can be taken advantage of by executing two or more threads in parallel (commonly referred to as "multi-threading"). In simple terms, a set of computational resources are applied to a first thread until a long-latency event (e.g., a main memory access) is encountered, then the resources are applied to a second thread until another long-latency event is encountered, and so on. By switching execution from one thread to another, processor cycles that would otherwise be idle are instead put to use, realizing a gain in performance.

SUMMARY OF THE INVENTION

Improved multi-threading methods, and systems thereof, are described. According to one embodiment of the present invention, a first thread is executed. Context for the executing thread is maintained in a working register. Execution of the first thread is halted and execution of a second thread is begun by performing a rollback operation. The rollback operation causes context for the second thread to be copied from a shadow register into the working register.

BRIEF DESCRIPTION OF THE DRAWINGS

The accompanying drawings, which are incorporated in and form a part of this specification, illustrate embodiments of the present invention and, together with the description, serve to explain the principles of the invention. The drawings referred to in this description should not be understood as being drawn to scale except if specifically noted.

DETAILED DESCRIPTION OF THE INVENTION

Figure 1:
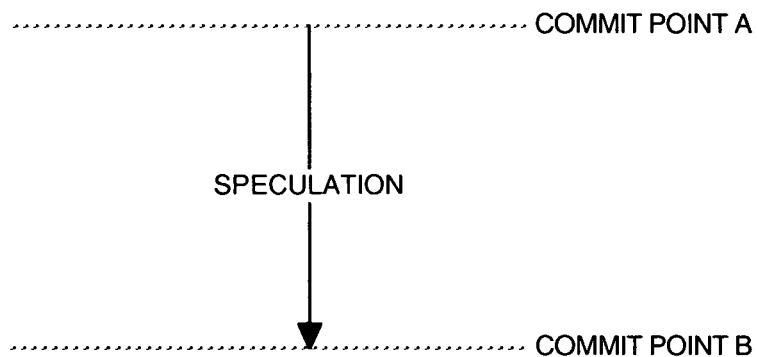
FIG. 1 illustrates a commit operation according to an embodiment of the present invention.

Reference will now be made in detail to the various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the present invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, bytes, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "executing," "switching," "dismissing," "detecting," "swapping," "storing," "holding," "copying," "performing," "instantiating," "identifying" or the like, refer to the action and processes (e.g., flowcharts 50, 60 and 70 of FIGS. 5, 6 and 7, respectively) of a computer system or similar intelligent electronic computing device (generally, a controller), that manipulates and transforms data represented as physical (electronic) quantities within the computer system's registers and memories into other data similarly represented as physical quantities within the computer system memories or registers or other such information storage, transmission or display devices.

Aspects of the present invention may be practiced on a computer system that includes, in general, a central processing unit (CPU) for processing information and instructions, random access (volatile) memory (RAM) for storing information and instructions, read-only (non-volatile) memory (ROM) for storing static information and instructions, a data storage device such as a magnetic or optical disk and disk drive for storing information and instructions, an optional user output device such as a display device (e.g., a monitor) for displaying information to the computer user, an optional user input device including alphanumeric and function keys (e.g., a keyboard) for communicating information and command selections to the processor, and an optional user input device such as a cursor control device (e.g., a mouse) for communicating user input information and command selections to the processor. The computer system may also include an input/output (I/O) device for providing a physical communication link between the computer system and a peripheral device or a network, using either a wired or a wireless communication interface.

FIG. 1 illustrates a commit operation in one embodiment in accordance with the present invention. In the example of FIG. 1, speculation proceeds from a prior commit operation at commit point A to the next commit operation at commit point B. A commit operation causes context (e.g., state information) in a foreground register (also referred to as a working register) to be copied into a background register (also referred to as a shadow or architectural register). Additional information is provided in conjunction with FIGS. 3 and 4, below. Speculation then begins anew from commit point B.

Figure 2:
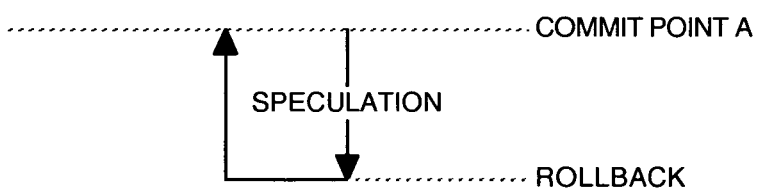
FIG. 2 illustrates a rollback operation according to an embodiment of the present invention.

FIG. 2 illustrates a rollback operation in one embodiment in accordance with the present invention. In the example of FIG. 2, speculation proceeds from a prior commit operation at commit point A. At commit point A, context is copied from the working register to a shadow register, and then speculation begins anew. During speculation, assumptions may be made regarding the scheduling or ordering of instructions. In some instances, an assumption may turn out to be invalid.

A rollback operation provides a mechanism for recovering from an invalid assumption. In a rollback operation, context in the shadow register (the information placed into the shadow register at commit point A) is copied into the working register. A rollback operation also rolls back or dismisses any speculative stores that occurred during execution of a thread. Thus, in essence, the rollback operation restores the state of the processor that existed at commit point A. Speculation can then begin again from commit point A. Speculation may proceed along a different path that will avoid the invalid assumption encountered in the prior speculation.

Commit and rollback operations, and dismissing speculative stores as part of a rollback operation, are described in the following patents, assigned to the assignee of the present invention and hereby incorporated by reference in their entirety: U.S. Pat. Nos. 5,832,205; 5,905,855; 5,926,832; 5,958,061; 6,011,908; 6,031,992 and 6,199,152.

Figure 3:
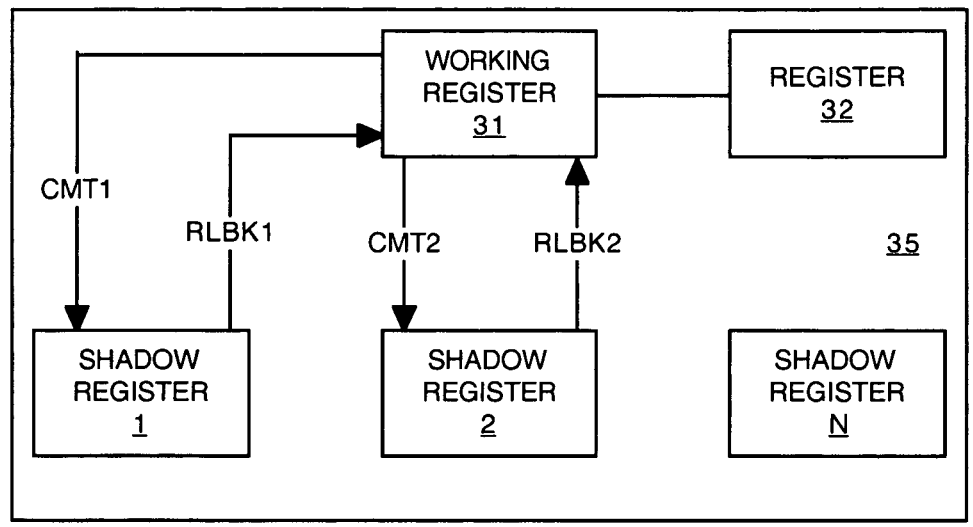
FIG. 3 is a block diagram illustrating the flow of information between registers according to an embodiment of the present invention.

FIG. 3 is a block diagram illustrating the flow of information between registers in one embodiment in accordance with the present invention. FIG. 3 illustrates some of the elements of a computer system 30. In the example of FIG. 3, computer system 30 includes a processor 35. In one embodiment, processor 35 includes a working register 31 and a number of shadow registers 1, 2, . . . , N. In general, the registers 31 and 1, 2, . . . , N are proximate to each other and to processor 35, in order to reduce latency.

Working register 31 (which may also be referred to as a foreground register) is for holding context (e.g., state information) for the thread currently being executed by processor 35. In general, as used herein, a "thread" refers to a part of a program that can execute independently of other parts of the program. In one embodiment, processor 35 implements a method of multi-threading in which a single thread is executed at a time. Computer system 30 may include multiples of such processors, allowing multiple threads to be executed simultaneously.

In the present embodiment, each of shadow registers 1, 2, . . . , N (which may also be referred to as architectural or background registers) holds context for a respective thread. Context is copied into one of the shadow registers 1, 2, . . . , N as the result of a commit operation that occurs during execution of a thread. For example, consider a first thread that is executing on processor 35. At some point during the execution of the first thread, a commit operation (CMT1) is performed, in which context for the first thread is copied from working register 31 to one of the shadow registers (e.g., shadow register 1). As execution of the first thread continues, the information in working register 31 will change, and subsequent commit operations will cause the context in working register 31 to be copied to shadow register 1, rewriting the context previously stored in shadow register 1. At some point during execution of the first thread, processor 35 switches execution from the first thread to a second thread. The second thread may be from the same program as the first thread, or from a program that is different from the program associated with the first thread. The switch may be triggered by a timer interrupt, a cache miss, an I/O access, or some other type of "long-latency event" associated with the first thread. At some point during execution of the second thread, a commit operation (CMT2) is performed. In the present embodiment, as a result of the CMT2 operation, context for the second thread is copied from working register 31 to a shadow register other than shadow register 1 (e.g., to shadow register 2).

During execution of a thread, a rollback operation may occur. As a result of the rollback operation, the context contained in a shadow register is copied into working register 31. In the present embodiment, as a result of a rollback operation during execution of the aforementioned first thread, the context contained in shadow register 1 is copied to working register 31 (RLBK1). Similarly, in the present embodiment, a rollback operation also causes the context contained in shadow register 2 to be copied into working register 1 (RLBK2). Recall that a shadow register contains context that was received at the most recent commit point. A rollback operation thus restores, for the thread currently being executed, the state of working register 31 to the state that existed at the last commit point preceding the rollback operation.

In one embodiment, register 32 contains information that is sufficient for identifying which of the shadow registers 1, 2, . . . , N is associated with the executing thread. Consider again the example above, in which the first thread is executing and a commit operation (e.g., CMT1) is performed, causing context for the first thread to be copied from working register 31 to shadow register 1. According to the present embodiment, register 32 includes information that associates shadow register 1 with the first thread. In general, processor 35 is able to determine which shadow register is to receive a copy of the information in working register 31 as the result of a commit operation, and processor 35 is able to determine which shadow register is to provide context for the executing thread as the result of a rollback operation.

Using the memory architecture described in conjunction with FIG. 3, execution can be switched from one thread to another thread using a rollback operation. Continuing with the examples above, in which context for a first thread is stored in shadow register 1 and context for a second thread is stored in shadow register 2, if it is necessary or advantageous to switch execution from some other thread to the first thread, then the RLBK1 operation is performed to load the context for the first thread into working register 31. If it then becomes necessary or advantageous to switch execution from the first thread to the second thread, then according to the example of FIG. 3, the RLBK2 operation is performed to load the context for the second thread into working register 31.

Note that, in the example above, a commit operation does not have to occur between, for example, RLBK1 and RLBK2. That is, in general, it is not necessary to commit context for an executing thread prior to using a rollback operation to switch execution to another thread.

In one embodiment, the following actions are performed to switch execution (and context) from one thread to another:

i) Roll back context for the executing (foreground) thread (e.g., the first thread);

ii) Set thread identifier to identify the second thread as the executing thread; and iii) Rollback to install into working register 31 the context for the new thread (e.g., the second thread).

Although two rollbacks are mentioned in the example above, the actions associated with the rollbacks can be accomplished with a single rollback operation.

In the example above, the rollback operation also rolls back or dismisses any speculative stores that occurred during execution of the first thread. In general, when execution is switched from one thread to another thread, speculative memory stores associated with the first thread are dismissed. Thus, memory coherence is maintained when execution is switched from one thread to another.

Figure 4:
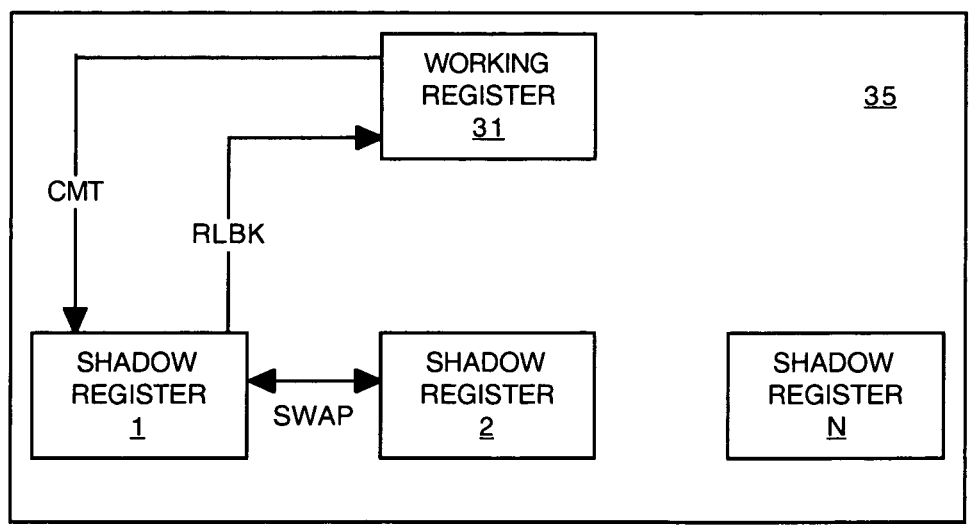
FIG. 4 is a block diagram illustrating the flow of information between registers according to another embodiment of the present invention.

FIG. 4 is a block diagram illustrating the flow of information between registers in another embodiment in accordance with the present invention. The example of FIG. 4 incorporates many of the same elements and features as the example of FIG. 3. However, in the example of FIG. 4, instead of using information in a register 32 to identify which shadow register is associated with the executing thread, context for the executing thread is held in one particular shadow register (e.g., shadow register 1), so that commit operations and rollback operations are always to and from the same shadow register. That is, working register 31 always interacts with the same shadow register (e.g., shadow register 1), which in turn interacts with the other shadow registers 2, . . . , N. In essence, information from the other shadow registers 2, . . . , N is channeled through shadow register 1 to working register 31, and vice versa. This is accomplished using a swap operation, which is described in more detail by the example below.

In the example of FIG. 4, execution can be switched from one thread to another thread using a rollback operation, as in the example of FIG. 3. Consider an example in which a first thread is executing, shadow register 1 includes context for the first thread, and shadow register 2 includes context for a second thread. Should a switch from the first thread to the second thread be necessary or advantageous, then the context contained in shadow register 1 is swapped with the context in shadow register 2, so that shadow register 1 now contains context for the second thread and shadow register 2 now contains context for the first thread. A rollback operation (RLBK) is then performed to copy the context from shadow register 1 into working register 31. If, during execution of the second thread, a commit operation (CMT) is performed, then context is copied from working register 31 into shadow register 1.

In one embodiment, the following actions are performed to switch execution (and context) from one thread to another:

i) Roll back context for the executing (foreground) thread (e.g., the first thread);

ii) Swap context information between shadow registers; and iii) Rollback to install into working register 31 the context for the new thread (e.g., the second thread).

Although two rollbacks are mentioned in the example above, the actions associated with the rollbacks can be accomplished with a single rollback operation.

In the sequence above, the rollback operation dismisses any speculative stores that occurred during execution of the first thread. Thus, memory coherence is maintained when execution is switched from one thread to another.

The descriptions above are based on examples that use two threads; however, these examples can be readily extended to situations involving more than two threads. In a multiple thread environment, the computer's operating system is informed of the number of threads that can be supported in hardware (e.g., the number of shadow registers). In addition to the types of operations described above, the operating system includes instructions that enable it to identify the executing thread, to interrupt the executing thread, and to halt the executing thread when the thread is in a consistent state. Furthermore, to switch execution from a current thread to a new thread, the operating system can include instructions that enable it to extract the context of the new thread and to insert that context into the executing stream of instructions.

Figure 5:
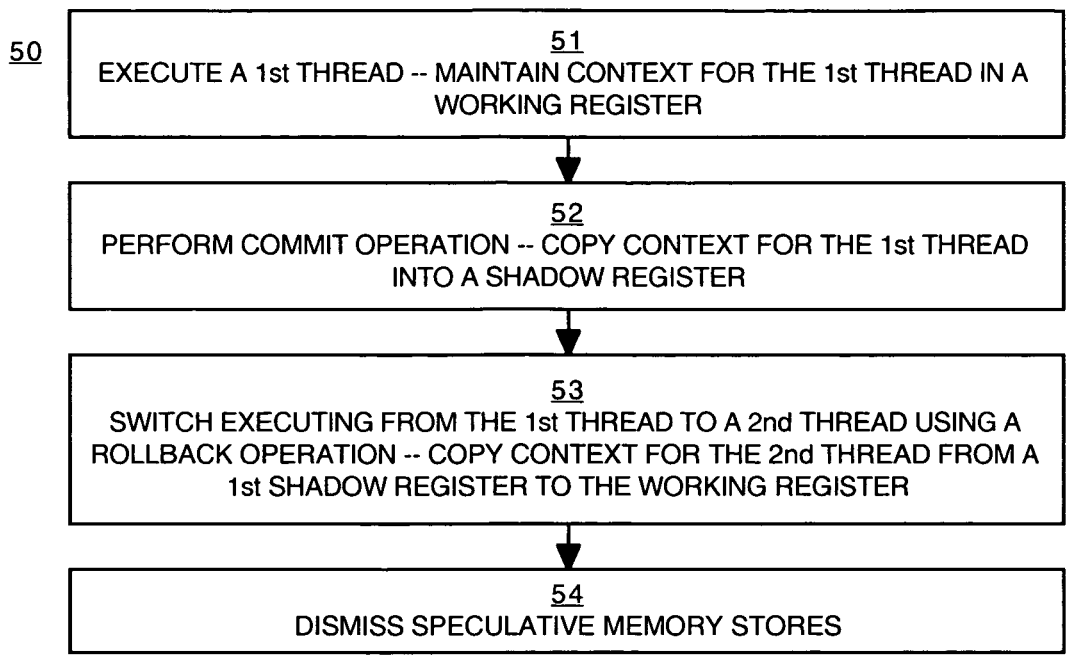
FIG. 5 is a flowchart of one embodiment of a method of multi-threading in accordance with the present invention.
Figure 6:
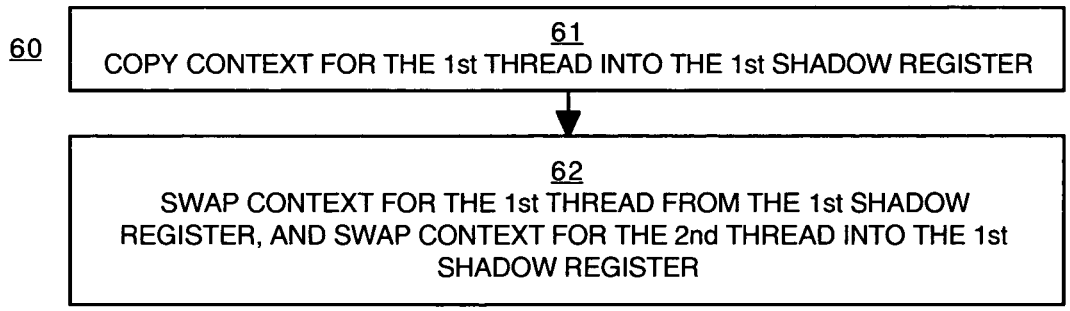
FIG. 6 is a flowchart of another embodiment of a method of multi-threading in accordance with the present invention.
Figure 7:
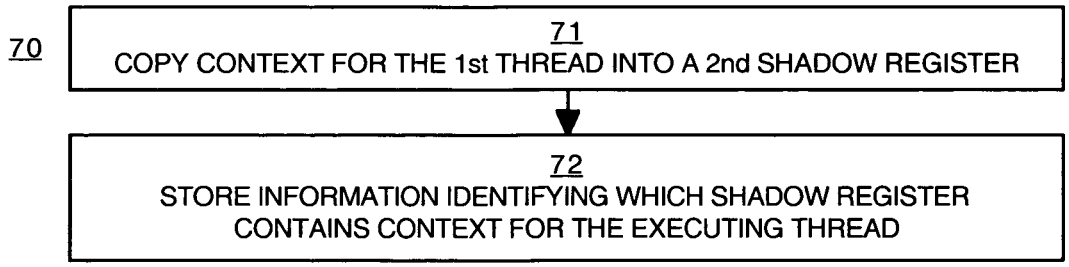
FIG. 7 is a flowchart of yet another embodiment of a method of multi-threading in accordance with the present invention.

FIGS. 5, 6 and 7 are flowcharts 50, 60 and 70, respectively, of methods of multi-threading in accordance with various embodiments of the present invention. Although specific steps are disclosed in flowcharts 50, 60 and 70, such steps are exemplary. That is, embodiments of the present invention are well-suited to performing various other steps or variations of the steps recited in flowcharts 50, 60 and 70. It is appreciated that the steps in flowcharts 50, 60 and 70 may be performed in an order different than presented, and that not all of the steps in flowcharts 50, 60 and 70 may be performed.

With reference first to FIG. 5, in step 51, a first thread is executed. Context for the executing thread—at this point, the first thread—is maintained in a working register (e.g., working register 31 of FIGS. 3 and 4).

In step 52 of FIG. 5, in one embodiment, a commit operation is performed so that the context for the executing thread—still the first thread—is copied into a shadow register selected from a plurality of shadow registers. Which of the shadow registers is selected to receive the context for the executing thread (still the first thread) depends on which embodiment of the present invention is being implemented (e.g., the embodiment of FIG. 3 versus the embodiment of FIG. 4). Step 52 is described further in conjunction with FIGS. 6 and 7, below.

In step 53 of FIG. 5, execution is switched from the first thread to a second thread using a rollback operation. The rollback operation causes context for the second thread to be copied from a shadow register to the working register (e.g., working register 31 of FIGS. 3 and 4). The shadow register that serves as the source of the context for the second thread depends on which embodiment of the present invention is being implemented (e.g., the embodiment of FIG. 3 versus the embodiment of FIG. 4).

In step 54 of FIG. 5, speculative stores are dismissed as part of the switch from executing the first thread to executing the second thread.

Reference is now made to FIG. 6, which pertains to a commit operation performed according to the embodiment of FIG. 4. In step 61 of FIG. 6, in the present embodiment, and prior to the switch in execution described in step 53 of FIG. 5, a commit operation is performed that causes context for the executing thread—at this point, the first thread—to be copied into, for example, shadow register 1 of FIG. 4.

In step 62 of FIG. 6, in the present embodiment, and prior to the switch in execution described in step 53 of FIG. 5, context for the first thread is swapped with context for the second thread, so that the context for the second thread is now in shadow register 1 of FIG. 4, while the context for the first thread is preserved in the shadow register that had held the context for the second thread. After the swap operation, the switch in execution described in step 53 of FIG. 5 can be performed.

Reference is now made to FIG. 7, which pertains to a commit operation performed according to the embodiment of FIG. 3. In step 71 of FIG. 7, in one embodiment, and prior to the switch in execution described in step 53 of FIG. 5, a commit operation is performed that causes the context for the first thread to be copied into a shadow register (a second shadow register) that is not the shadow register that contains the context for the second thread. Thus, instead of copying the context for the executing thread into the same shadow register regardless of which thread is executing as in the embodiment of FIG. 6, in the embodiment of FIG. 7 the shadow register into which the context for the executing thread is copied depends on which thread is being executed.

In step 72 of FIG. 7, in one embodiment, information identifying which of the shadow registers contains context for the executing thread is stored in memory.

In summary, embodiments in accordance with the present invention describe multi-threading methods and systems that use a context switch that is implemented using a working register and a number of shadow registers. An advantage to implementing the context switch in the manner described herein is that memory pipes, ports into register files, bypassing networks, etc., only deal with the size of the context contained in the working register for the executing thread, and not with the extended (and extendable) size introduced by the contexts contained in the shadow registers for each of the additional threads.

Another advantage provided by embodiments in accordance with the present invention is that contemporary operating systems and processors can be readily adapted or extended to implement the context switch being implemented as described herein. For example, the context switch described herein is implemented using commit and rollback commands that, except for the additional functionality provided by the present invention, are known in the art. That is, the commit operation is still used to copy the state of a working register, and the rollback operation is still used to restore the working register to an earlier state. However, by introducing multiple shadow registers, the states for multiple threads can be stored and restored. Also, except perhaps for maintaining information identifying which shadow register is associated with which thread, the context switch implemented as described herein is virtually invisible to the computer system.

Embodiments in accordance with the present invention are thus described. While the present invention has been described in particular embodiments, it should be appreciated that the present invention should not be construed as limited by such embodiments, but rather construed according to the below claims.

What is claimed is:

1. A method of multi-threading, said method comprising:
   storing information for a first thread in a working register during execution of said first thread, wherein said working register is coupled to a plurality of shadow registers; and
   switching from executing said first thread to executing a second thread, wherein said switching comprises rollback of information in said working register without copying, to one of said shadow registers, information that is in said working register at the time of said switching; and wherein said rollback further comprises copying information for said second thread from a first shadow register into said working register in place of information that is in said working register.

2. The method of claim 1 wherein said rollback further comprises dismissing speculative stores.

3. The method of claim 1 wherein said switching is responsive to detection of a long-latency event.

4. The method of claim 1 further comprising, at a commit point prior to said rollback, copying information for said first thread that is in said working register at said commit point to said first shadow register.

5. The method of claim 4 further comprising, after said commit point and prior to said switching, swapping: i) information for said second thread from one of said shadow registers into said first shadow register and ii) information from said first shadow register into one of said shadow registers.

6. The method of claim 1 further comprising, at a commit point prior to said rollback, copying information for said first thread that is in said working register at said commit point to a second shadow register.

7. The method of claim 6 further comprising storing information that identifies which shadow register contains information for an executing thread.

8. A computer system comprising:
   a working register operable for holding first context associated with a first thread, wherein said first context comprises uncommitted context generated responsive to execution of said first thread; and
   a plurality of shadow registers coupled to said working register, wherein at least one of said shadow registers is operable for holding second context associated with a non-executing second thread, wherein said second thread is executable in place of said first thread responsive to a rollback operation, and wherein said rollback operation is configured to copy said second context into said working register in place of said first context and to dump said uncommitted context before it is copied to another register.

9. The computer system of claim 8 wherein speculative stores are dismissed if said second thread is instantiated.

10. The computer system of claim 8 wherein said rollback operation is performed responsive to detection of a long-latency event.

11. The computer system of claim 8 operable to execute a commit operation, wherein said commit operation is configured to copy said first context to a first shadow register during execution of said first thread.

12. The computer system of claim 11 operable to execute a swap operation prior to switching execution from said first thread to said second thread, wherein said swap operation is configured to swap said first context from said first shadow register and to swap said second context into said first shadow register.

13. The computer system of claim 8 operable to execute a commit operation, wherein said commit operation is configured to copy said first context to another of said shadow registers during execution of said first thread.

14. The computer system of claim 13 further comprising a memory operable for storing information identifying which of said shadow registers is holding said first context.

15. A computer system comprising:
   a processor operable for executing a number of threads in parallel;
   a plurality of registers coupled to said processor and comprising a working register and said number of shadow registers, said computer system configured to perform operations comprising:
      at a commit point during execution of a first thread, copying first context associated with said first thread from said working register to a first shadow register;
      subsequent to said commit point, continuing execution of said first thread, wherein said continuing execution causes changes to said first context;

subsequent to said commit point and before another commit point is reached, performing a rollback operation that causes second context for a non-executing second thread to be copied into said working register in place of said first context and that discards said changes before they are copied to another register; and subsequent to said rollback operation, beginning execution of said second thread and ending execution of said first thread.

16. The computer system of claim 15 wherein said operations further comprise dismissing speculative stores.

17. The computer system of claim 15 wherein said rollback operation is performed in response to a long-latency event during execution of said first thread.

18. The computer system of claim 15 wherein said operations further comprise, after said commit point and prior to switching execution from said first thread to said second thread, swapping said first context from said first shadow register and swapping said second context into said first shadow register.

19. The computer system of claim 15 wherein said operations further comprise storing information identifying which of said shadow registers contains said first context and which of said shadow registers contains said second context.

20. A system comprising:

means for storing information for a first thread in a working register during execution of said first thread, wherein said working register is coupled to a plurality of shadow registers; and means for switching from executing said first thread to executing a second thread, wherein said means for switching comprises: i) means for rollback of information in said working register without copying to one of said shadow registers, information that is in said working register at the time of said switching, and ii) means for copying information for said second thread from a first shadow register into said working register in place of information that is in said working register.

* * * * *